United States Patent [19]

Beach

[11] 4,118,195

[45] Oct. 3, 1978

[54] MEDICAL APPARATUS FOR TRANSPORTING FLUIDS

[76] Inventor: Janet Beach, P.O. Box 904, Camden, Me. 04843

[21] Appl. No.: 710,129

[22] Filed: Jul. 30, 1976

[51] Int. Cl.[2] .................................................. G01N 1/14

[52] U.S. Cl. .................................... 222/215; 73/425.6; 128/2 F; 141/25; 422/100

[58] Field of Search ................................. 23/259, 292; 73/425.6 R, 425.6 P; 141/25, 26, 28; 128/2 F

[56] References Cited

U.S. PATENT DOCUMENTS

| | | | |
|---|---|---|---|
| 2,773,521 | 12/1956 | Persson | 141/25 X |
| 3,348,921 | 10/1967 | Katz et al | 23/292 X |
| 3,449,081 | 6/1969 | Hughes | 73/425.6 X |
| 3,697,227 | 10/1972 | Goldstein et al. | 23/253 TP |

*Primary Examiner*—R.E. Serwin
*Attorney, Agent, or Firm*—William G. Rhines

[57] ABSTRACT

In one embodiment, this invention comprises a normally open, resilient bulb which has a long tube at one end and an opening at the other end adapted for pressure tight removeable inter-connection with the access opening of an associated container, whereby a pre-determined volume of material may be transferred from a source directly to the container, or vice versa.

9 Claims, 4 Drawing Figures

MEDICAL APPARATUS FOR TRANSPORTING FLUIDS

BACKGROUND OF INVENTION

Frequently, it is desired to transfer liquid from one location to another without contaminating or otherwise varying the composition of the transferred liquid. Thus, for example, a standard and widely used medical procedure is to test patient's urine samples. One method for doing so is through utilization of the so-called "midstream catch" technique. With this method, the process of urination is interrupted so that urine may be caught in a paper cup, from which it is poured into a centrifuge tube or other vessel for subsequent testing. The sample is taken part way through the urination process rather than at the beginning to best assure that the sample is as nearly as possible representative in chemical composition, i.e., does not contain a distorting concentration of sediments, etc. Obviously, procedures like the 'midstream' are messy, and frequently introduce contaminants into the sample, from the cup, the sampler's hands, or other sources. Conversely, frequently it is desired to administer dosages of materials in predeterminded amounts. For example, it may be desired to administer liquids, such as saline solutions, or powders, such as anti-biotic powders which may be aerated and airborne. Previous techniques and apparatus have, for the most part, been premised on the transfer of the desired substance from its container into a syringe or other pump as a pre-requisite to actually administering it. Such techniques and apparatus risk contamination and/or loss of the substance during the course of handling, and also enhance the possibility of there being an error made as to the dosage. These and other objectionable effects in this and related fields have long caused persons skilled in the cognizant arts to seek improved structures and methods for achieving improved desired results.

Accordingly, it is an object of this invention to provide inexpensive, effective, and reliable means for transporting fluids and fluidizable material from one location to another.

Another object of this invention is to provide such means which will minimize or eliminate the introduction of aberrating materials.

Yet another object of this invention is to provide means for achieving the foregoing objectives in disposable form.

Still another object of this invention is to provide means for achieving the foregoing objectives and to provide means for moving desired volumes of materials without materially varying their composition.

Another object of this invention is to provide means for achieving the foregoing objectives in a manner which is more nearly consistent with normal procedures and apparatus and requires fewer modifications thereof.

SUMMARY OF INVENTION

Desired objectives may be achieved through practice of the present invention which, in one embodiment comprises a normally open, resilient bulb which has a long tube at one end and an opening at the other end adapted for pressure tight removeable interconnection with the access opening of an associated container, whereby a pre-determined volume of material may be transfered from a source directly to the container, or vice versa.

DESCRIPTION OF DRAWINGS

This invention may be understood from the description which follows and from the associated drawings in which.

DESCRIPTION OF PREFERRED EMBODIMENTS

Figure 1:
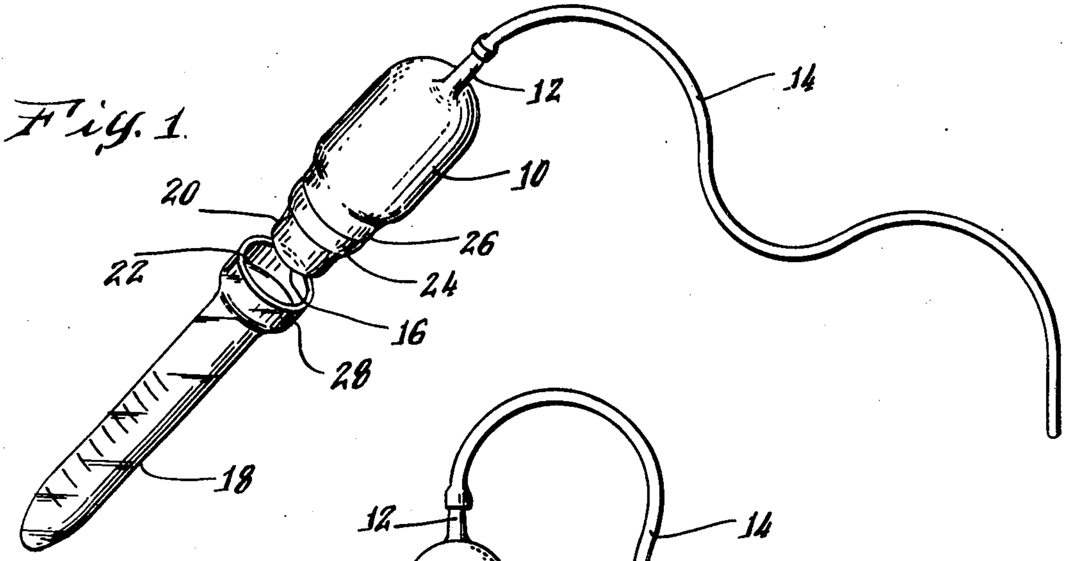
FIG. 1 depicts one embodiment of this invention.

Referring first to FIG. 1, there is depicted one embodiment of the present invention, as it may be utilized for handling urine samples. It comprises a main body 10 made from resilient material, such as polyethylene, which is substantially impermeable to water and stable chemically to the substances to which it is to be exposed. As such, it may be made to be normally biased outward in the expanded condition of maximum volume of its internal chamber, but may be collapsed by the application of pressure from the outside so as to reduce the volume of a chamber in the interior of the bulb described by the walls of the bulb. At one end of the bulb 10, a hollow tip 12 is formed, to form a pathway from the exterior of the bulb into the interior chamber. Attached to the tip 12 is a conduct member 14 which, preferably for this application, is a transparent plastic tube which may be bonded to the bulb chemically or by the application of adhesives, or may be pressure fit on the tip, or may even be formed as part of the tip.

The opposite end of the bulb 10 is formed into an opening 16 extending from the outside of the bulb into the interior chamber, the surrounding bulb portion of which is adapted for substantially pressure tight contact with an associated receptacle body 18; in this case, a centrifuge tube. The particular form of adaptation may, of course, by varied appropriately to accomodate the configuration of the opening into the particular kind of receptacle to be used, but in any event should be such that a substantially pressure-tight juncture may be effected for reasons which will be apparent from the description which follows. Thus, as will be apparent from FIG. 1, in this particular adaptation for joining to a centrifuge tube as shown, the endmost portion 20 is formed so as to have an outside diameter substantially equal to or slightly larger than the inside diameter of the access opening 22 of the centrifuge tube 18. Adjacent the portion 20, a shoulder 24 may be formed by the portion 26 of the bulb being somewhat larger in diameter than the endmost portion 20. Thus, the shoulder 24 may be made to serve as an abutment and/or additional pressure seal through cooperative interaction with the outermost surface 28 at the opening 22 of the receptacle 18.

Figure 2:
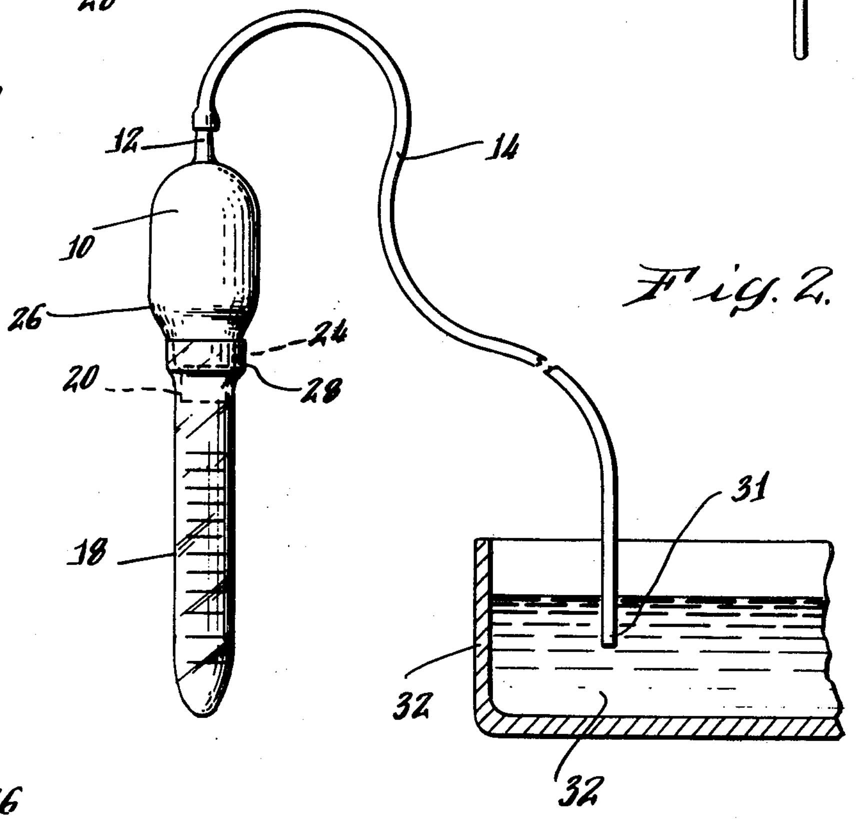
FIG. 2 depicts one manner of using the embodiments of this invention such as that shown in FIG. 1.

FIG. 2 illustrates a manner of using the embodiment of this invention shown in FIG. 1, wherein a urine sample is to be taken. The endportion 20 of the bulb 10 has been inserted into the opening 22 of the centrifuge tube 18, with a pressure-tight fit due to its outside diameter being at least as large as the inside diameter of the opening 22. The open end 31 of the tube 14 is inserted in urine 32 which has been collected in a bedpan or other receptacle 30. By keeping the end 31 off the floor of the pan 30, it is possible to get a sample which does not contain concentrations of heavier constituents that have settled out, and which therefore is more nearly representative as a sample of the mass of material per se.

Figure 2A:
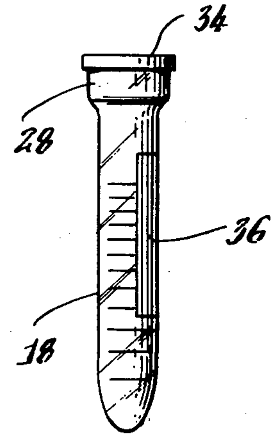
FIG. 2A depicts a cupped centrifuge tube after filling with the embodiment shown in FIG. 1.

In operation, upon the bulb 10 being squeezed and released a partial vacuum will be set up in the tube 14 because the pressure-tight connection between the end portion 20 of the bulb 10 and the interior of the opening 22 of the receptacle 18 in effect causes the receptacle to prevent the vacuum induced thereby from being relieved, thus causing urine to be sucked up through the tube 14 and into the cavity in the interior of the bulb 10. However, since the cavity communicates with the outside of the bulb 10 via the opening 16, liquid drawn into the cavity will not be retained in it, but will be passed through directly into the tube 18. It should be noted that this operation takes place without direct contact between the operator and the material so collected, and without contact between the material and surfaces which may not be sterile or which may contain contaminating matter. It should also be noted that by this means, samples of material may be passed directly into a container, such as a centrifuge tube, which, as shown in FIG. 2A, may be immediately marked with the patient's indentification on a label 36, and may be capped with a sterile plastic cap 34.

Figure 3:
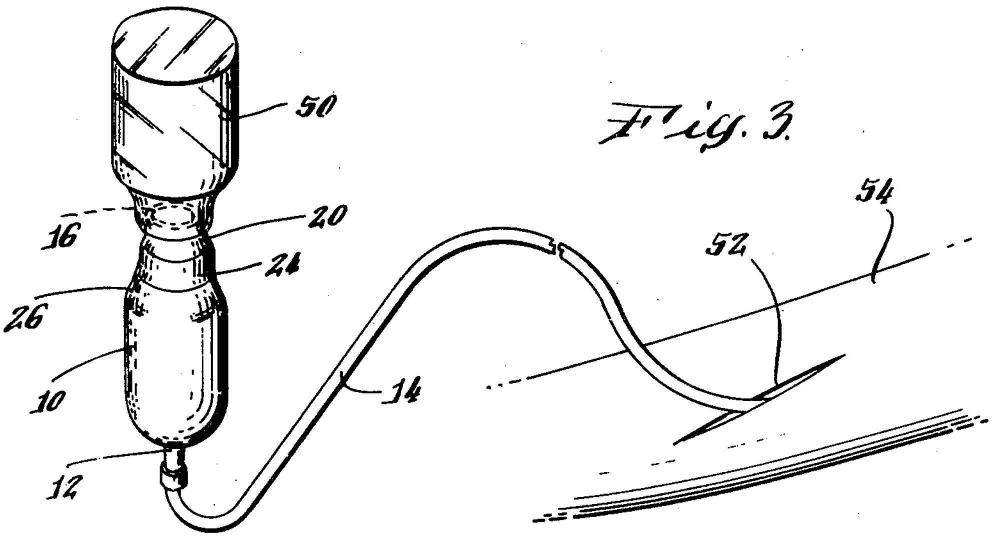
FIG. 3 depicts another manner of using embodiments of this invention such as that shown in FIG. 1.

FIG. 3 illustrates another method for utilization of embodiments of the present invention. As shown, the end 20 of the bulb 10 may be inserted into the top of a container 50 of liquid, such as saline solution, medication or the like, or powders, such as anti-biotics, which may be aerated so as to render them capable of being air borne. When so inserted and inverted so that the bulb opening 16 faces upward, the material in the container 50 will pass by gravity into the central cavity of the bulb 10, from whence manual collapsing of the bulb 10 against its natural bias toward openness will cause the material to be propelled through the tube, for example into an opening 52 in the surface of a patient's skin. By this means, exact dosages may be administered without fear of contamination.

It should be noted that embodiments of this invention are particularly suited to being rendered into disposable form, and that as such the components may be made from durable, chemically stable, strong plastic materials which may be easily sterilized and packaged.

It will also be apparent that structural variations may also be desirable in certain instances. For example, the aperture 16, whether or not as part of a neck-like extension 10 of the main body of the bulb 10, may be adapted for surrounding contact of the outside of the container to which it is to be interconnected, rather than vice versa as shown in FIGS. 1, 2 and 3. Further, this aperture may be located at points on the bulb other than at the opposite end of the bulb 10 from the tip 12. For example, it might be located at one side of the bulb, even though, as will be obvious from FIGS. 2 and 3 particularly, locating the aperature at the end of the bulb opposite the tip 12 helps greatly to ensure that all materials pass through the bulb rather than some part of them becoming trapped inside it.

Thus, it is to be understood that the embodiments of this invention described and illustrated herein are by way of illustration and not of limitation, and that other embodiments will be apparent to those skilled in the arts without departing materially from the spirit or scope of this invention.

I claim:

1. A device for moving fluids and fluidizable materials from one location to another comprising
   - a main body portion having an internal chamber described by a surrounding wall made from resilient material which is collapsible by the application of pressure from the exterior thereof so as to cause the volume of said chamber to decrease, and is normally biased against being collapsed,
   - conduit means communicating with said chamber and providing a continuous, valveless flow path thereto from outside of said main body,
   - said main body having an access opening therein extending through said wall and into said chamber at a location other than that at which the flow path provided by said conduit means passes through said wall into said chamber,
   - said main body being adapted for attaining substantially pressure tight removeable interconnection between a portion of the outer surface thereof and an access opening in an associated container, which portion includes within it all of said access opening into said body.

2. The device described in claim 1 wherein said adaptation of said main body comprises an elongated neck.

3. The device described in claim 2 wherein said neck is at the opposite end of said main body from said conduit means.

4. The device described in claim 1 wherein said main body is a bulb and said conduit means is an elongated tube.

5. The device described in claim 2 wherein said main body is a bulb and said conduit means is an elongated tube.

6. The device described in claim 3 wherein said main body is a bulb and said conduit means is an elongated tube.

7. The device described in claim 2 wherein said portion is exterior of said neck.

8. The device described in claim 3 wherein said portion is exterior of said neck.

9. The device described in claim 4 wherein said portion is exterior of said neck.

* * * * *